United States Patent
Bi et al.

(10) Patent No.: US 12,302,340 B2
(45) Date of Patent: May 13, 2025

(54) COMMUNICATION METHOD AND DEVICE

(71) Applicant: HUAWEI TECHNOLOGIES CO., LTD., Guangdong (CN)

(72) Inventors: Wenping Bi, Shenzhen (CN); Zheng Yu, Beijing (CN); Xiang Mi, Beijing (CN); Yubo Yang, Shanghai (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 17/489,317

(22) Filed: Sep. 29, 2021

(65) Prior Publication Data

US 2022/0022217 A1    Jan. 20, 2022

Related U.S. Application Data

(63) Continuation of application No. PCT/CN2019/080656, filed on Mar. 29, 2019.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0004* (2013.01); *H04W 24/10* (2013.01); *H04W 72/1263* (2013.01); *H04W 72/535* (2023.01)

(58) Field of Classification Search
CPC .................................................. H04W 72/23
See application file for complete search history.

(56) References Cited

U.S. PATENT DOCUMENTS

2018/0132212 A1    5/2018  Rico Alvarino et al.
2018/0279274 A1*   9/2018  Sun ................... H04W 52/367
(Continued)

FOREIGN PATENT DOCUMENTS

CN    101742652 A    6/2010
CN    103686934 A    3/2014
(Continued)

OTHER PUBLICATIONS

PCT International Search Report and Written Opinion issued in International Application No. PCT/CN2019/080656 on Jan. 8, 2020, 17 pages (with English translation).
(Continued)

*Primary Examiner* — Jason E Mattis
(74) *Attorney, Agent, or Firm* — Fish & Richardson P.C.

(57) ABSTRACT

Embodiments of this application provide a communication method and device. The method includes: A first device determines first control information, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or preconfigured uplink resource reconfiguration information. The first device sends the first control information to a second device. According to the method and device provided in the embodiments of this application, a network coverage capability can be improved, and the method and device may be applied to the internet of things, for example, MTC, IoT, LTE-M, or M2M.

22 Claims, 4 Drawing Sheets

(51) Int. Cl.
*H04W 24/10* (2009.01)
*H04W 72/1263* (2023.01)
*H04W 72/50* (2023.01)

(56) References Cited

U.S. PATENT DOCUMENTS

| | | | | |
|---|---|---|---|---|
| 2020/0314859 | A1* | 10/2020 | Choe | H04W 28/04 |
| 2021/0119722 | A1* | 4/2021 | Munier | H04L 5/0055 |
| 2021/0321413 | A1* | 10/2021 | Shin | H04W 72/23 |
| 2021/0377954 | A1* | 12/2021 | Mi | H04L 1/188 |
| 2021/0385834 | A1* | 12/2021 | Morozov | H04W 72/1268 |
| 2022/0140979 | A1* | 5/2022 | Bhatoolaul | H04L 5/0094 370/329 |
| 2022/0141810 | A1* | 5/2022 | Takeda | H04W 74/002 370/330 |

FOREIGN PATENT DOCUMENTS

| | | |
|---|---|---|
| CN | 108633041 A | 10/2018 |
| CN | 109392005 A | 2/2019 |
| EP | 3923635 A1 | 12/2021 |
| EP | 3927078 A1 | 12/2021 |
| IN | 201941006027 * | 2/2019 |
| WO | 2018203627 A1 | 11/2018 |

OTHER PUBLICATIONS

Office Action issued in Japanese Application No. 2021-557689 on Oct. 3, 2022, 9 pages (with English translation).

Sierra Wireless, "Pre-configured UL Resources Design Considerations," 3GPP TSG RAN WG2 #104, R2-1817940, Spokane, USA, Nov. 12-16, 2018, 10 pages.

Extended European Search Report issued in European Application No. 19922740.6 on Mar. 4, 2022, 9 pages.

3GPP TS 36.213 V14.10.0 (Mar. 2019), "3rd Generation Partnership Project; Technical Specification Group Radio Access Network; Evolved Universal Terrestrial Radio Access (E-UTRA); Physical layer procedures (Release 14)," Mar. 2019, 472 pages.

3GPP TS 36.212 V15.5.0 (Mar. 2019), "3rd Generation Partnership Project; Technical Specification Group Radio Access Network;Evolved Universal Terrestrial Radio Access (E-UTRA); Multiplexing and channel coding (Release 15)," Mar. 2019, 241 pages.

3GPP TS 36.321 V15.4.0 (Dec. 2018), "3rd Generation Partnership Project; Technical Specification Group Radio Access Network; Evolved Universal Terrestrial Radio Access (E-UTRA); Medium Access Control (MAC) protocol specification (Release 15)," Dec. 2018, 131 pages.

3GPP TS 36.331 V15.4.0 (Dec. 2018), "3rd Generation Partnership Project; Technical Specification Group Radio Access Network; Evolved Universal Terrestrial Radio Access (E-UTRA); Radio Resource Control (RRC); Protocol specification (Release 15)," Dec. 2018, 933 pages.

Sequans Communications, 3GPP TSG RAN WG1 Meeting #95 R1-1902552, Consideration for preconfigured uplink resources (PUR), Athens, Greece, Feb. 25-Mar. 1, 2019, 6 pages.

EP Communication Pursuant to Article 94(3) EPC in European Appln No. 19922740.6, dated Jun. 14, 2024, 7 pages.

Sierra Wireless, "NB-IOT Pre-configured UL Resources Design Considerations," 3GPP TSG RAN WG1 Meeting #95, R1-1812726, Spokane, USA, Nov. 12-16, 2018, 11 pages.

Office Action in Korean Appln. No. 2021-7034323, mailed on Feb. 18, 2025, 10 pages (with English translation).

* cited by examiner

COMMUNICATION METHOD AND DEVICE

CROSS-REFERENCE TO RELATED APPLICATIONS

This application is a continuation of International Application No. PCT/CN2019/080656, filed on Mar. 29, 2019, the disclosure of which is hereby incorporated by reference in its entirety.

TECHNICAL FIELD

This application relates to the field of communications technologies, and in particular, to a communication method and device.

BACKGROUND

For some services, there is a relatively large interval between two services, and a communication data packet is relatively small. To save energy and reduce signaling overheads, in LTE release 16, it is determined to standardize a mechanism for transmission on a predefined resource, namely, communication in which dynamic downlink control information (downlink control information, DCI) is not required for scheduling, which is also referred to as scheduling-free transmission. A process of uplink scheduling-free transmission is as follows: When a terminal device needs to send uplink data, a network device does not need to perform dynamic uplink scheduling on the terminal device. The terminal device performs uplink transmission on a preconfigured transmission resource in a preset sending manner.

Currently, after the terminal device performs uplink transmission on a preconfigured uplink resource (preconfigured uplink resource, PUR), the network device may feed back ACK/NACK information on a PDCCH, where the ACK indicates that the preconfigured-resource transmission succeeds, and the NACK indicates that the preconfigured-resource transmission fails. After the network device feeds back the ACK/NACK information, the terminal device needs to continue to monitor, within a specific time period, whether there is DCI for scheduling downlink data, and receive the downlink data by using the DCI. It can be learned that, in a downlink scheduling process, the terminal device needs to blindly detect the DCI for scheduling the downlink data. This increases power consumption of the terminal device.

SUMMARY

Embodiments of this application provide a communication method and device, to resolve a current-technology problem of power consumption waste of a terminal device in a downlink scheduling process.

According to a first aspect, an embodiment of this application provides a communication method. The method includes: A first device determines first control information, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or preconfigured uplink resource reconfiguration information.

The first device sends the first control information to a second device. In this embodiment of this application, when feeding back the state of the preconfigured-resource transmission to the second device, the first device indicates, to the second device, whether the higher layer data and/or the PUR reconfiguration information is transmitted. In this way, when receiving the state of the preconfigured-resource transmission, the second device may determine whether to receive the higher layer data and/or the PUR reconfiguration information. Compared with a current-technology manner in which the second device blindly detects DCI for scheduling downlink data, in this embodiment of this application, when the first device does not transmit the higher layer data and/or the PUR reconfiguration information, the first device may notify the second device by using the first control information. In this way, the second device may not need to monitor DCI for scheduling the higher layer data, so that the second device can reduce a quantity of times of blind detection, thereby reducing power consumption of the second device.

In a possible design, the first control information is downlink control information.

In a possible design, the second indication information may include indication information used to indicate whether the first information is carried on a physical shared channel scheduled by the first control information. Alternatively, the second indication information includes indication information used to indicate the second device whether to detect second control information, where the second control information is used to schedule the first information. Alternatively, the second indication information includes indication information used to indicate whether the first control information includes the preconfigured uplink resource reconfiguration information. Alternatively, the second indication information includes indication information used to indicate, to the second device, whether the first control information includes the preconfigured uplink resource reconfiguration information, and indication information used to indicate the second device whether to detect third control information, where the third control information is used to schedule the higher layer data.

In a possible design, a first field in the first control information may be used to indicate the second indication information. In the foregoing design, the second indication information is indicated by reusing a field in the first control information. In this way, an increase in control information overheads can be avoided, thereby avoiding a decrease in spectral efficiency, improving system resource utilization, and avoiding an increase in user power consumption.

In a possible design, the first control information is control information in format 6-1A or format 6-1B. The first field may be a resource block assignment field in the first control information. In the foregoing design, the second indication information is indicated by using the resource block assignment field, so that a bit may not be added to the first control information. In this way, an increase in control information overheads can be effectively avoided, thereby avoiding a decrease in spectral efficiency, improving system resource utilization, and avoiding an increase in user power consumption.

In a possible design, when all bits in the first field are set to 1, the second indication information may indicate that the first device transmits the first information; or when not all bits in the first field are set to 1, the second indication information may indicate that the first device does not transmit the first information. In the foregoing design, the second indication information is specifically indicated by reusing a reserve state in the resource block assignment field (that is, setting all bits to 1). In this way, an increase in control information overheads can be effectively avoided, system resource utilization can be improved, and DCI usage flexibility can be improved.

In a possible design, the first control information is control information in format N0. The first field may be a subcarrier indication field or a modulation and coding scheme field in the first control information. In the foregoing design, there are some reserve states of the subcarrier indication field or the modulation and coding scheme field in the control information in format N0. The second indication information is indicated by using the reserve states of the subcarrier indication field or the modulation and coding scheme field, so that a bit may not be added to the first control information. In this way, an increase in control information overheads can be effectively avoided, system resource utilization can be improved, and DCI usage flexibility can be improved.

In a possible design, the first control information is control information in format N1 and is used to indicate a scheduling grant. The first field is a modulation and coding scheme field in the first control information. In the foregoing design, there are some reserve states of the modulation and coding scheme field in the control information, in format N1, used to indicate the scheduling grant. The second indication information is indicated by using the reserve states of the modulation and coding scheme field, so that a bit may not be added to the first control information. In this way, an increase in control information overheads can be effectively avoided, system resource utilization can be improved, and DCI usage flexibility can be improved.

In a possible design, the first control information is control information in format N1 and is used to indicate a physical control channel instruction. The first field may be a starting number of NPRACH repetitions field, a subcarrier indication of NPRACH field, or a reserved field in the first control information. In the foregoing design, there are some reserve states of the starting number of NPRACH repetitions field or the subcarrier indication of NPRACH field in the control information, in format N1, used to indicate the physical control channel instruction, and the control information further includes some unused reserved fields. The second indication information is indicated by using the reserve states or the reserved fields, so that a bit may not be added to the first control information. In this way, an increase in control information overheads can be effectively avoided, system resource utilization can be improved, and DCI usage flexibility can be improved.

In a possible design, a second field and a third field in the first control information are used to indicate the second indication information. In the foregoing design, the second indication information is indicated by reusing two fields in the first control information. In this way, an increase in control information overheads can be avoided, system resource utilization can be improved, and accuracy of indicating the second indication information can also be improved.

In a possible design, the second field may be a resource block assignment field in the first control information. If all bits in the second field are set to 1, the third field is used to indicate the second indication information.

In a possible design, the first control information is control information in format N1 and is used to indicate a physical control channel instruction. The second field may be a starting number of NPRACH repetitions field, a subcarrier indication of NPRACH field, or a reserved field in the first control information.

In a possible design, the first control information is control information in format N1 and is used to indicate a scheduling grant. The second field may be a modulation and coding scheme field in the first control information.

In a possible design, the first control information is control information in format N0. The second field may be a subcarrier indication field or a modulation and coding scheme field in the first control information.

In a possible design, cyclic redundancy check (cyclic redundancy check, CRC) code of the first control information may be scrambled by using first scrambling code, where the first scrambling code may be a system information radio network temporary identifier (system information radio network temporary identifier, SI-RNTI).

According to a second aspect, an embodiment of this application provides a communication method. The method includes: A second device receives first control information sent by a first device, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or preconfigured uplink resource reconfiguration information. After determining that the second indication information indicates that the first device transmits the first information, the second device receives the first information based on the second indication information. In this embodiment of this application, when feeding back the state of the preconfigured-resource transmission to the second device, the first device indicates, to the second device, whether the higher layer data and/or the PUR reconfiguration information is transmitted. In this way, when receiving the state of the preconfigured-resource transmission, the second device may determine whether to receive the higher layer data and/or the PUR reconfiguration information. Compared with a current-technology manner in which the second device blindly detects DCI for scheduling downlink data, in this embodiment of this application, when the first device does not transmit the higher layer data and/or the PUR reconfiguration information, the first device may notify the second device by using the first control information. In this way, the second device may not need to monitor DCI for scheduling the higher layer data, so that the second device can reduce a quantity of times of blind detection, thereby reducing power consumption of the second device.

In a possible design, the first control information is downlink control information.

In a possible design, the second indication information may include indication information used to indicate whether the first information is carried on a physical shared channel scheduled by the first control information. Alternatively, the second indication information includes indication information used to indicate the second device whether to detect second control information, where the second control information is used to schedule the first information. Alternatively, the second indication information includes indication information used to indicate whether the first control information includes the preconfigured uplink resource reconfiguration information. Alternatively, the second indication information includes indication information used to indicate, to the second device, whether the first control information includes the preconfigured uplink resource reconfiguration information, and indication information used to indicate the second device whether to detect third control information, where the third control information is used to schedule the higher layer data.

In a possible design, a first field in the first control information may be used to indicate the second indication information. In the foregoing design, the second indication information is indicated by reusing a field in the first control information. In this way, an increase in control information overheads can be avoided, thereby avoiding a decrease in spectral efficiency, improving system resource utilization, and avoiding an increase in user power consumption.

In a possible design, the first control information is control information in format 6-1A or format 6-1B. The first field may be a resource block assignment field in the first control information. In the foregoing design, the second indication information is indicated by using the resource block assignment field, so that a bit may not be added to the first control information. In this way, an increase in control information overheads can be effectively avoided, thereby avoiding a decrease in spectral efficiency, improving system resource utilization, and avoiding an increase in user power consumption.

In a possible design, when all bits in the first field are set to 1, the second indication information may indicate that the first device transmits the first information; or when not all bits in the first field are set to 1, the second indication information may indicate that the first device does not transmit the first information. In the foregoing design, the second indication information is specifically indicated by reusing a reserve state in the resource block assignment field (that is, setting all bits to 1). In this way, an increase in control information overheads can be effectively avoided, system resource utilization can be improved, and DCI usage flexibility can be improved.

In a possible design, the first control information is control information in format N0. The first field may be a subcarrier indication field or a modulation and coding scheme field in the first control information. In the foregoing design, there are some reserve states of the subcarrier indication field or the modulation and coding scheme field in the control information in format N0. The second indication information is indicated by using the reserve states of the subcarrier indication field or the modulation and coding scheme field, so that a bit may not be added to the first control information. In this way, an increase in control information overheads can be effectively avoided, system resource utilization can be improved, and DCI usage flexibility can be improved.

In a possible design, the first control information is control information in format N1 and is used to indicate a scheduling grant. The first field is a modulation and coding scheme field in the first control information. In the foregoing design, there are some reserve states of the modulation and coding scheme field in the control information, in format N1, used to indicate the scheduling grant. The second indication information is indicated by using the reserve states of the modulation and coding scheme field, so that a bit may not be added to the first control information. In this way, an increase in control information overheads can be effectively avoided, system resource utilization can be improved, and DCI usage flexibility can be improved.

In a possible design, the first control information is control information in format N1 and is used to indicate a physical control channel instruction. The first field may be a starting number of NPRACH repetitions field, a subcarrier indication of NPRACH field, or a reserved field in the first control information. In the foregoing design, there are some reserve states of the starting number of NPRACH repetitions field or the subcarrier indication of NPRACH field in the control information, in format N1, used to indicate the physical control channel instruction, and the control information further includes some unused reserved fields. The second indication information is indicated by using the reserve states or the reserved fields, so that a bit may not be added to the first control information. In this way, an increase in control information overheads can be effectively avoided, system resource utilization can be improved, and DCI usage flexibility can be improved.

In a possible design, a second field and a third field in the first control information are used to indicate the second indication information. In the foregoing design, the second indication information is indicated by reusing two fields in the first control information. In this way, an increase in control information overheads can be avoided, system resource utilization can be improved, and accuracy of indicating the second indication information can also be improved.

In a possible design, the second field may be a resource block assignment field in the first control information. If all bits in the second field are set to 1, the third field is used to indicate the second indication information.

In a possible design, the first control information is control information in format N1 and is used to indicate a physical control channel instruction. The second field may be a starting number of NPRACH repetitions field, a subcarrier indication of NPRACH field, or a reserved field in the first control information.

In a possible design, the first control information is control information in format N1 and is used to indicate a scheduling grant. The second field may be a modulation and coding scheme field in the first control information.

In a possible design, the first control information is control information in format N0. The second field may be a subcarrier indication field or a modulation and coding scheme field in the first control information.

In a possible design, CRC of the first control information may be scrambled by using first scrambling code, where the first scrambling code may be an SI-RNTI.

According to a third aspect, this application provides an apparatus. The apparatus may be a first device, a second device, or a chip. The apparatus has a function of implementing any embodiment in the first aspect or the second aspect. The function may be implemented by hardware, or may be implemented by hardware executing corresponding software. The hardware or the software includes one or more modules corresponding to the function.

According to a fourth aspect, an apparatus is provided. The apparatus includes a processor, a communications interface, and a memory. The communications interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the communication method according to any one of the first aspect or the designs of the first aspect, or any one of the second aspect or the designs of the second aspect.

According to a fifth aspect, this application further provides a system. The system includes the first device according to any embodiment of the first aspect and the second device according to any embodiment of the second aspect.

According to a sixth aspect, this application further provides a computer-readable storage medium, and the computer-readable storage medium stores instructions. When the instructions are run on a computer, the computer is enabled to perform the methods according to the foregoing aspects.

According to a seventh aspect, this application further provides a computer program product that includes instructions. When the computer program product runs on a computer, the computer is enabled to perform the methods according to the foregoing aspects.

DESCRIPTION OF EMBODIMENTS

Figure 1:
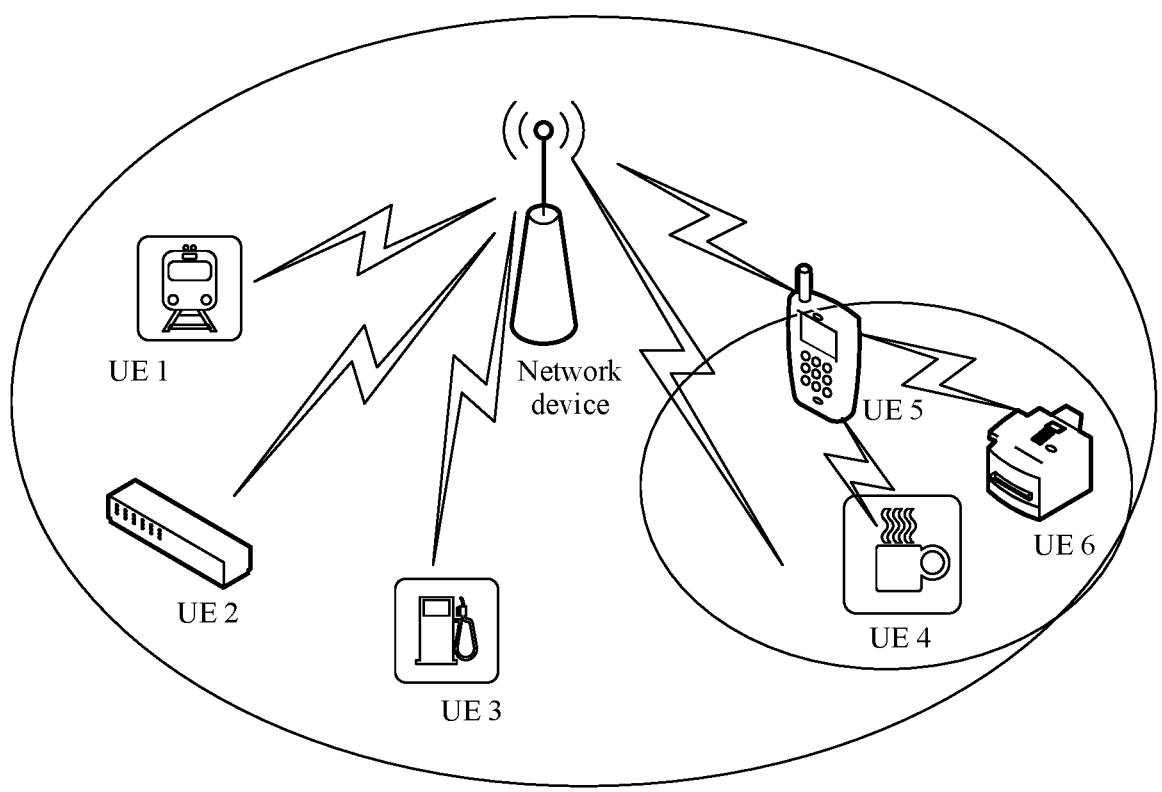
FIG. 1 is a schematic architectural diagram of a communications system according to an embodiment of this application.

The following further describes in detail embodiments of this application with reference to the accompanying drawings.

A communication method provided in this application may be applied to various communications systems. For example, the communications system may be an internet of things (internet of things, IoT) system, a narrowband internet of things (narrowband internet of things, NB-IoT) system, or a long term evolution (long term evolution, LTE) system, or may be a fifth generation (5G) communications system, or may be a hybrid architecture of LTE and 5G, or may be a 5G new radio (new radio, NR) system, a global system for mobile communications (global system for mobile communication, GSM) system, a universal mobile telecommunications system (universal mobile telecommunications system, UMTS), a code division multiple access (code division multiple access, CDMA) system, and a new communications system that will emerge in future communication development. The communication method provided in the embodiments of this application may be used, provided that an entity in the communications system can send control information used to schedule a transport block and send and receive a transport block, and another entity can receive the control information used to schedule the transport block and receive and send the transport block.

A terminal device in the embodiments of this application is a device, for example, a handheld device or a vehicle-mounted device that has a wireless connection function that provides voice and/or data connectivity for a user. The terminal device may alternatively be another processing device connected to a wireless modem. The terminal device may communicate with one or more core networks through a radio access network (radio access network, RAN). The terminal device may also be referred to as a wireless terminal, a subscriber unit (subscriber unit), a subscriber station (subscriber station), a mobile station (mobile station), a remote station (remote station), an access point (access point), a remote terminal (remote terminal), an access terminal (access terminal), a user terminal (user terminal), a user agent (user agent), a user device (user device), user equipment (user equipment), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). For example, common terminal devices include a mobile phone, a tablet computer, a notebook computer, a palmtop computer, a mobile internet device (mobile internet device, MID), and a wearable device such as a smartwatch, a smart band, or a pedometer. However, the embodiments of this application are not limited thereto.

A network device in the embodiments of this application may be configured to mutually convert a received over-the-air frame and an internet protocol (internet protocol, IP) packet and serve as a router between the terminal device and a remaining part of the access network. The remaining part of the access network may include an IP network and the like. The network device may further coordinate attribute management of an air interface. For example, the network device may be a base transceiver station (base transceiver station, BTS) in the global system for mobile communications (global system for mobile communication, GSM) system or the code division multiple access (code division multiple access, CDMA) system, a NodeB (NodeB) in the wideband code division multiple access (wideband code division multiple access, WCDMA) system, an evolved NodeB (evolutional NodeB, eNB or e-NodeB) in the LTE system, a new radio controller (new radio controller, NR controller), a gNodeB (gNB) in the 5G system, a centralized unit (centralized unit), a new radio base station, a remote radio unit, a micro base station, a relay (relay), a distributed unit (distributed unit), a transmission reception point (transmission reception point, TRP) or a transmission point (transmission point, TP), or any other radio access device. However, the embodiments of this application are not limited thereto. The network device may cover one or more cells.

FIG. 1 shows a communications system according to an embodiment of this application. The communications system includes a network device and six terminal devices, namely, UE 1 to UE 6. In the communications system, the UE 1 to the UE 6 may send uplink data to the network device, and the network device may receive the uplink data sent by the UE 1 to the UE 6. In addition, a communications subsystem may alternatively include the UE 4 to the UE 6. The network device may send downlink information to the UE 1, the UE 2, the UE 3, and the UE 5, and the UE 5 may send the downlink information to the UE 4 and the UE 6 based on a device-to-device (device-to-device, D2D) technology. FIG. 1 is merely a schematic diagram, and a type of a communications system, a quantity of devices included in the communications system, a type of a device included in the communications system, and the like are not specifically limited.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

In the communications system, the UE may be in three states: an idle (idle) mode, an inactive (inactive) mode, and a connected (connected) mode. UE in connected mode may communicate with a base station through dynamic scheduling performed by the base station, to transmit data. However, UE in idle mode cannot transmit data through dynamic scheduling performed by the base station, but can transmit data after random access is performed and an RRC connection is established, or include a small amount of uplink data in a message 3 in a random access process. The inactive mode may be considered as an intermediate state of the two modes. The UE and the core network reserve a context of a radio resource control (radio resource control, RRC) message in the connected mode. Therefore, compared with the idle mode, the connected mode may be entered by the UE at a faster speed. According to a current LTE protocol, when the UE switches from the RRC connected mode into the idle mode, an RRC configuration message is not reserved, but the context of the RRC message is reserved when the UE switches from the connected mode into the inactive mode.

Figure 2:
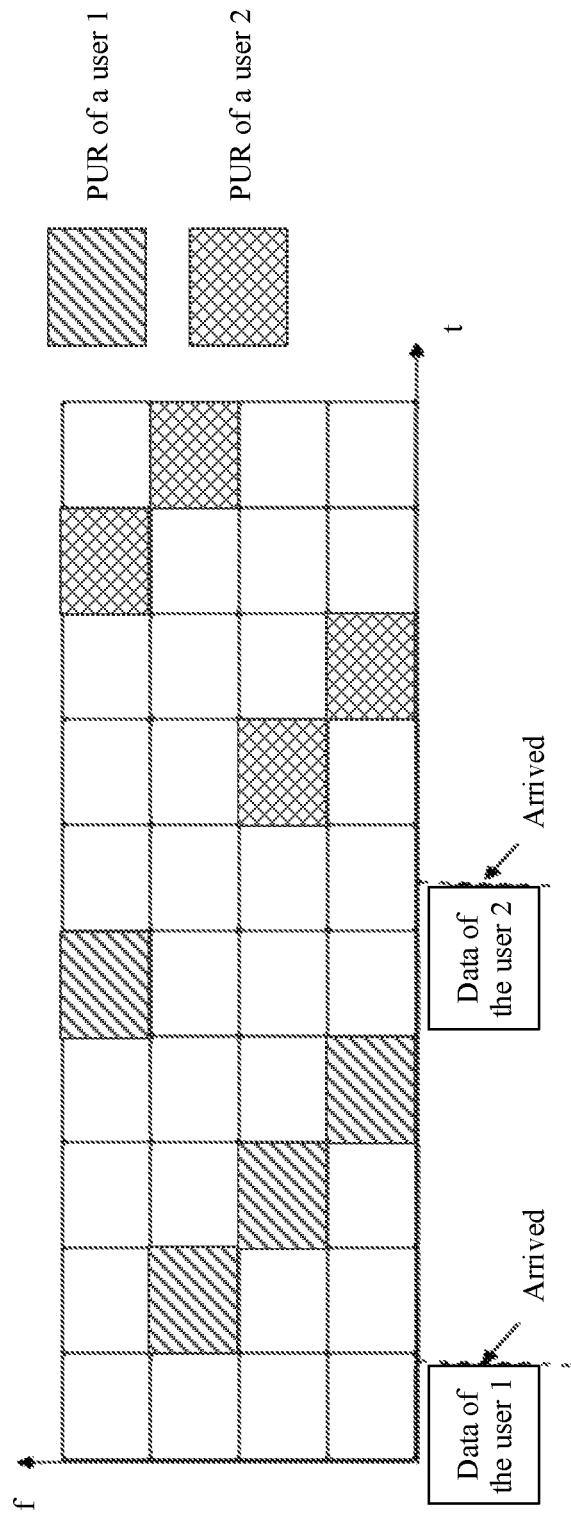
FIG. 2 is a schematic diagram of preconfigured-resource transmission according to an embodiment of this application.

To reduce resource overheads, reduce a data transmission delay, and save energy, as shown in FIG. 2, some services may be transmitted on predefined resources, that is, dynamic downlink control information (downlink control information, DCI) is not required for scheduling. A user transmits a signal on a preconfigured resource. Such transmission is referred to as configuration scheduling transmission, and is also referred to as preconfigured-resource transmission, preconfigured-resource scheduling-free transmission, or scheduling-free transmission. In particular, the preconfigured resource may be a preconfigured uplink resource. A process of uplink scheduling-free transmission or preconfigured uplink resource transmission (preconfigured uplink resource transmission, PUR) is as follows: When the terminal device needs to send uplink data, the network device does not need to perform dynamic uplink scheduling on the terminal device. The terminal device performs uplink transmission on a preconfigured transmission resource in a preset sending manner.

Currently, after the terminal device performs uplink transmission on a preconfigured uplink resource (preconfigured uplink resource, PUR), the network device may feed back ACK/NACK information on a PDCCH, where the ACK indicates that the preconfigured-resource transmission succeeds, and the NACK indicates that the preconfigured-resource transmission fails. After the network device feeds back the ACK/NACK information, the terminal device needs to continue to monitor, within a specific time period, whether there is DCI for scheduling downlink data, and receive the downlink data by using the DCI. It can be learned that, in a downlink scheduling process, the terminal device needs to blindly detect the DCI for scheduling the downlink data. This increases power consumption of the terminal device.

Based on this, the embodiments of this application provide a communication method and device, to resolve a current-technology problem of power consumption waste of a terminal device in a downlink scheduling process. The method and the apparatus are based on a same inventive concept. Because a problem-resolving principle of the method is similar to that of the device, for implementation of the apparatus and the method, refer to each other. Details are not repeatedly described.

"A plurality of" in the embodiments of this application refers to two or more than two.

It should be understood that, in descriptions of this application, words such as "first" and "second" are merely used for distinction and description, and shall not be understood as an indication or implication of relative importance or an indication or implication of an order.

Figure 3:
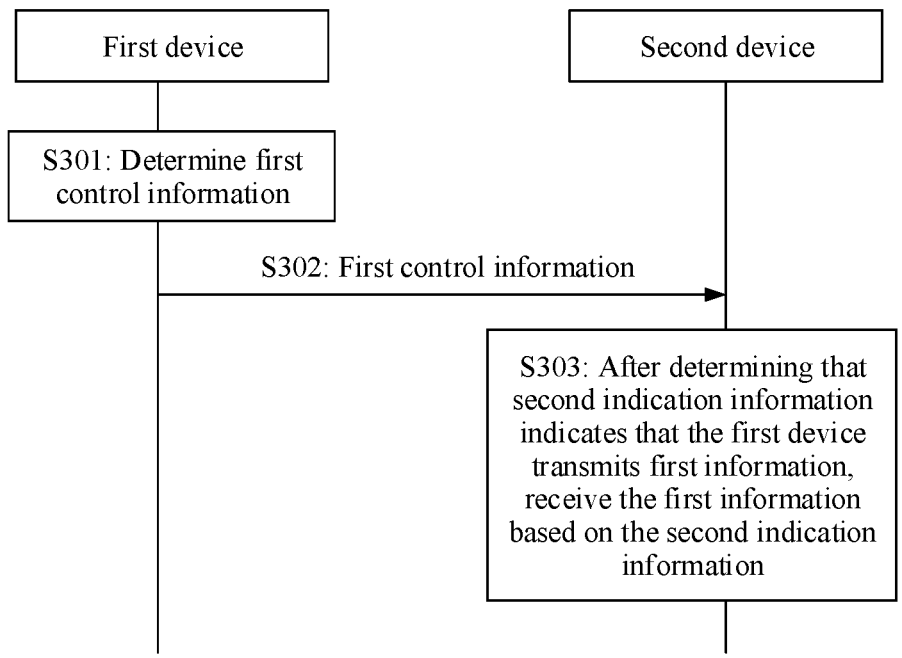
FIG. 3 is a schematic flowchart of a communication method according to an embodiment of this application.

FIG. 3 is a flowchart of a communication method according to this application. The method may be applied to a second device in the communications system shown in FIG. 1, and the method includes the following steps.

S301: A first device determines first control information, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or PUR reconfiguration information.

"The higher layer data" may also be referred to as "downlink data", "data", or "downlink higher layer data". It may be understood that, after the second device successfully transmits information to the first device in a preconfigured transmission manner, there is corresponding interaction information, for example, a higher layer ACK, between the first device and the second device.

During specific implementation, the first control information includes the first indication information. In this case, the first control information may not include the second indication information. Alternatively, the first control information includes the second indication information. In this case, the first control information may not include the first indication information. Alternatively, the first control information may include the higher layer data and/or the PUR reconfiguration information when the first indication information indicates successful transmission (namely, an ACK), or may include the PUR reconfiguration information when the first indication information indicates unsuccessful transmission, scheduling retransmission, or preconfigured uplink resource retransmission (namely, a NACK).

It should be noted that a preconfigured uplink resource (preconfigured uplink resource, PUR) is merely an example name. Essentially, the network device configures the resource, so that the second device can transmit uplink information on the resource without requiring the first device to perform dynamic scheduling or use downlink control information to perform scheduling. The resource may alternatively have another name, for example, a configured grant resource. It should be understood that, if the configured grant resource can also implement a function implemented by a preconfigured uplink resource in this embodiment of this application, the configured grant resource may also be understood as the preconfigured uplink resource in this embodiment of this application. For ease of description, the resources are collectively referred to as the preconfigured uplink resource in this embodiment of this application.

The preconfigured-resource transmission may mean that the second device performs data transmission on the preconfigured uplink resource based on a preset parameter. "The preconfigured-resource transmission" in this embodiment of this application may also be referred to as "a preconfigured transmission manner", "scheduling-free transmission", "scheduling-free preconfigured-resource transmission", or the like. It should be understood that, "the preconfigured-resource transmission" in this embodiment of this application is merely an example for description. During actual application, "the preconfigured-resource transmission" may alternatively have another name. The other name can also implement a function of "the preconfigured-resource transmission" in this embodiment of this application, and it may be understood that an uplink signal is transmitted in a preconfigured-resource transmission manner. For ease of description, the transmission manners are collectively referred to as the preconfigured-resource transmission in this embodiment of this application.

The preconfigured-resource retransmission may mean that retransmission is performed on the preconfigured uplink resource or on a part of the preconfigured uplink resource. In other words, dynamic scheduling information (for example, DCI) is not required for scheduling, but retransmission is performed by using the preconfigured uplink resource. However, configuration information of a corresponding preconfigured resource may be reconfigured or updated by using the dynamic scheduling information.

The scheduling retransmission means that the second device performs retransmission based on scheduling information in dynamic scheduling information (for example, DCI) of the first device.

The preconfigured uplink resource reconfiguration information may include, but is not limited to, one or more of the following information: a timing (timing) advance, power control information, a repetition number, a modulation and coding scheme (modulation and coding scheme, MCS), a transport block size (transport block size, TBS), or the like.

For example, the first control information may be downlink control information in an LTE eMTC system, downlink control information in an NR system, or the like. This is not specifically limited herein. For ease of description, the following uses an example in which the first control information is downlink control information (downlink control information, DCI).

During specific implementation, the second indication information may include indication information used to indicate whether the first information is carried on a physical downlink shared channel (physical downlink shared channel, PDSCH) scheduled by the first control information.

It should be noted that, in this embodiment of this application, "that the first control information schedules the first information", "that the first control information schedules the PDSCH", "that the first information is carried in the PDSCH scheduled by the first control information", and "that there is first information" may all be understood as that the PDSCH scheduled by the first control information includes the first information.

Alternatively, the second indication information may include indication information used to indicate the second device whether to detect second control information, where the second control information is used to schedule the first information.

It should be noted that, in this embodiment of this application, "that the second device detects the second control information" and "that the second device monitors a first search space, where the first search space is a search space for carrying or transmitting the second control information" may both be understood as that the second device is required to monitor the second control information.

Alternatively, the second indication information may include indication information used to indicate whether the first control information includes the preconfigured uplink resource reconfiguration information.

Alternatively, the second indication information may include indication information used to indicate whether the second device includes the preconfigured uplink resource reconfiguration information in the first control information, and indication information used to indicate the second device whether to detect third control information, where the third control information is used to schedule the higher layer data.

It should be noted that, in this embodiment of this application, "that the second device detects the third control information" and "that the second device monitors a second search space, where the second search space is a search space for carrying or transmitting the third control information" may both be understood as that the second device is required to monitor the third control information.

The first device may be a network device, and the second device may be a terminal device. Alternatively, the second device may be a network device, and the first device may be a terminal device. Alternatively, the first device may be a device having a sending capability, and the second device may be a device having a receiving capability.

S302: The first device sends the first control information to the second device. Correspondingly, the second device determines, based on the second indication information, whether to receive the first information.

During specific implementation, the first control information may be one or more pieces of control information. If the first control information is one piece of control information, the control information includes two pieces of indication information: the first indication information and the second indication information. If the first control information is a plurality of pieces of control information, one piece of control information includes the first indication information, the other piece of control information includes the second indication information. The plurality of pieces of control information may be sent together, so that the second device can receive the plurality of pieces of control information together without performing additional detection.

S303: After determining that the second indication information indicates that the first device transmits the first information, the second device receives the first information based on the second indication information.

In this embodiment of this application, when feeding back the state of the preconfigured-resource transmission to the second device, the first device indicates, to the second device, whether the higher layer data and/or the preconfigured uplink resource reconfiguration information is transmitted. In this way, when receiving the state of the preconfigured-resource transmission, the second device may determine whether to receive the higher layer data and/or the preconfigured uplink resource reconfiguration information. Compared with a current-technology manner in which the second device blindly detects DCI for scheduling downlink data, in this embodiment of this application, when the first device does not transmit the higher layer data and/or the preconfigured uplink resource reconfiguration information, the first device may notify the second device by using the first control information. In this way, the second device may not need to monitor DCI for scheduling the higher layer data, so that the second device can reduce a quantity of times of blind detection, thereby reducing power consumption of the second device.

For ease of description, in this embodiment of this application, "that the PDSCH scheduled by the first control information carries the first information", "that the PDSCH is scheduled by the first control information," "that the first control information indicates to detect the second control information," and "that the first control information indicates to monitor the first search space" are collectively referred to as "scheduling the first information"; "that the PDSCH scheduled by the first control information carries the higher layer data", "that the first control information indicates to detect the third control information", "that the first control information indicates to monitor the second search space", "that the first control information carries the higher layer data", and the like are all referred to as "that there is higher layer data"; and "that the PDSCH scheduled by the first control information carries the PUR reconfiguration information", "that the first control information includes the PUR reconfiguration information", and the like are all referred to as "including the PUR reconfiguration information".

During specific implementation, the first device may indicate the second indication information in the first control information in, but not limited to, the following two manners.

Manner 1: The first control information may indicate the second indication information by using a field. For example, a first field is used to indicate the second indication information. Further, when the first field indicates the second indication information, it may be considered that the pre-configured-resource transmission succeeds. In other words, the first field may indicate successful preconfigured-resource transmission and the second indication information.

In an example description, the first control information may be control information in format (format) 6-1A or format 6-1B. The first field may be a resource block assignment (resource block assignment) field in the first control information. For example, when all bits in the first field are set to 1, the second indication information may indicate that the first device does not schedule the PDSCH, and may further indicate successful transmission; or when not all bits in the first field are set to 1, the second indication information may indicate that the first device schedules the PDSCH, and may further indicate successful transmission (or successful reception). For example, the first information includes the higher layer data. Refer to Table 1. In this embodiment of this application, "successful transmission" may also be referred to as "successful reception".

TABLE 1

| Resource block assignment | Indication content |
| --- | --- |
| All bits are set to 1 | Successful reception and no PDSCH scheduling |
| Other values (not all 1s) | Successful reception and PDSCH scheduling |

It should be noted that Table 1 is merely an example for description. A state of the first field, indication content, a correspondence between a state and indication content, and the like are not specifically limited. Alternatively, when all bits in the first field are set to 1, the second indication information may indicate that the first device schedules the PDSCH, and may further indicate successful transmission; or when not all bits in the first field are set to 1, the second indication information may indicate that the first device does not schedule the PDSCH, and may further indicate successful transmission.

In another example description, the first control information is control information in format N0. The first field may be a subcarrier indication (subcarrier indication) field or a modulation and coding scheme (modulation and coding scheme, MCS) field in the first control information. For reserve states of the subcarrier indication field and the MCS field, refer to Table 2. For example, when a subcarrier spacing is 3.75 kHz, if the subcarrier indication field is set to a value ranging from 48 to 63, it indicates successful reception and no PDSCH scheduling. For another example, when a subcarrier spacing is 15 kHz, if the subcarrier indication field is set to a value ranging from 19 to 63, it indicates successful reception and no PDSCH scheduling. For another example, for single-tone, if the MCS field is set to a value ranging from 11 to 15, it indicates successful reception and no PDSCH scheduling. For another example, for multi-tone, if the MCS field is set to 14 or 15, it indicates successful reception and no PDSCH scheduling.

TABLE 2

| Field (Field) | Quantity of bits (Bits) | Any reserve states (Any reserve states?) | Note (Note) |
| --- | --- | --- | --- |
| Flag for format N0/format N1 differentiation | 1 | No (No) | |
| Subcarrier indication | 6 | Yes (Yes) | For 3.75 kHz, 48 to 63 are reserved. (16 reserve states in total) (For 3.75 kHz: 48 to 63 are reserved. (16 reserve states in total)) For 15 kHz, 19 to 63 are reserved. (45 reserve states in total) (For 15 kHz: 19 to 63 are reserved. (45 reserve states in total)) |
| Resource assignment | 3 | No | |
| Scheduling delay (Scheduling delay) | 2 | No | |
| MCS | 4 | Yes | For single-tone, $I_{MCS}$ = 0 to 10 are used (For single-tone: $I_{MCS}$ = 0 to 10 are used); For multi-tone, $I_{MCS}$ = 0 to 13 are used (For multi-tone: $I_{MCS}$ = 0 to 13 are used); $I_{MCS}$ = 15 is used for EDT ($I_{MCS}$ =15 is used by EDT); $I_{MCS}$ = 14 is reserved ($I_{MCS}$ = 14 is reserved) |
| Redundancy version (Redundancy version) | 1 | No | |
| Repetition number (Repetition number) | 3 | No | |
| New data indicator (New data indicator) | 1 | No | |
| DCI subframe repetition number (DCI subframe repetition number) | 2 | No | |

In still another example description, the first control information is control information in format N1 and is used to indicate a scheduling grant. The first field may be an MCS field in the first control information. For a reserve state of the MCS field, refer to Table 3. For example, if the MCS field is set to 14 or 15, it indicates successful reception and no PDSCH scheduling.

TABLE 3

| Field | Bits | Any reserve states? | Note |
|---|---|---|---|
| Flag for format N0/format N1 differentiation | 1 | No | |
| NPDCCH order indicator (NPDCCH order indicator) | 1 | No | |
| Scheduling delay $I_{Delay}$ | 3 | No | |
| Resource assignment $I_{RU}$ | 3 | No | |
| Modulation and coding scheme $I_{MCS}$ | 4 | Yes | $I_{MCS}$ = 0 to 13 are used; Two states ($I_{MCS}$ = 14, 15) are reserved |
| Repetition number $I_{Rep}$ | 4 | No | |
| New data indicator | 1 | No | |
| HARQ-ACK resource (HARQ-ACK resource) | 4 | No | |
| DCI subframe repetition number | 2 | No | |

In yet another example, the first control information is control information in format N1 and is used to indicate a physical control channel instruction. The first field may be a starting number of NPRACH repetitions field, a subcarrier indication of NPRACH field, or a reserved field in the first control information. For a reserve state of the MCS field, refer to Table 4. For example, if the subcarrier indication of NPRACH field is set to a value ranging from 48 to 63, it indicates successful reception and no PDSCH scheduling.

TABLE 4

| Field | Bits | Any reserve states? | Note |
|---|---|---|---|
| Flag for format N0/format N1 differentiation | 1 | No | |
| NPDCCH order indicator | 1 | No | |
| Starting number of NPRACH repetitions (Starting number of NPRACH repetitions) | 2 | Yes | One state is reserved (1 state is reserved) |
| Subcarrier indication of NPRACH (Subcarrier indication of NPRACH) field | 6 | Yes | 48 to 63 are reserved (16 reserve states in total) |
| Carrier indication of NPRACH (Carrier indication of NPRACH) | 4 | No | |
| All remaining bits in format N1 are set to 1 (All the remaining bits in format N1 are set to one) | | | Nine bits are reserved (9 reserved bits) |

Manner 2: The first control information may indicate the second indication information by using two fields. For example, a second field and a third field are used to indicate the second indication information. Further, when the first control information indicates the second indication information by using the second field and the third field, it may be considered that the PUR succeeds. In other words, the second field and the third field indicate successful preconfigured-resource transmission and the second indication information.

In an example description, the second field may be a resource block assignment field in the first control information. If all bits in the second field are set to 1, the third field may be used to indicate the second indication information.

The third field may indicate, by using two value states, whether the first information is transmitted. For example, one state of the third field indicates PDSCH scheduling, and may further indicate successful transmission; and the other state of the third field indicates no PDSCH scheduling, and may further indicate successful transmission. Refer to Table 5-1.

TABLE 5-1

| Third field | Indication content |
|---|---|
| One state | Successful transmission and no PDSCH scheduling |
| Other state | Successful transmission and PDSCH scheduling |

For example, the third field is a repetition number field, and the first information includes the higher layer data. When all bits in the repetition number field are set to 1, it may indicate successful transmission and no PDSCH scheduling. Refer to Table 5-2.

TABLE 5-2

| Repetition number field | Indication content |
|---|---|
| All bits are set to 1 | Successful transmission and no PDSCH scheduling |

It should be understood that Table 5-2 is merely an example for description. A type of the third field, a state of the third field, content indicated by the third field, a correspondence between a state and indication content, and the like are not specifically limited.

For another example, one state of the third field indicates that the first control information includes the preconfigured uplink resource reconfiguration information, and may further indicate successful transmission; and the other state of the third field indicates that the first control information does not include the preconfigured uplink resource reconfiguration information, and may further indicate successful transmission. Refer to Table 5-3.

TABLE 5-3

| Third field | Indication content |
|---|---|
| One state | Successful transmission, and preconfigured uplink resource reconfiguration information is included |
| Other state | Successful transmission, and preconfigured uplink resource reconfiguration information is not included |

In this embodiment of this application, "that the preconfigured uplink resource reconfiguration information is included" may mean that the first control information includes the preconfigured uplink resource reconfiguration information, or may mean that downlink data scheduled by the first control information includes the preconfigured uplink resource reconfiguration information.

For still another example, one state of the third field indicates that there is no higher layer data and the preconfigured uplink resource reconfiguration information is not included, and may further indicate successful transmission; and the other state of the third field indicates that there is higher layer data and the preconfigured uplink resource reconfiguration information is included, and may further indicate successful transmission. Refer to Table 5-4.

TABLE 5-4

| Third field | Indication content |
| --- | --- |
| One state | Successful transmission, there is no higher layer data, and preconfigured uplink resource reconfiguration information is not included |
| Other state | Successful transmission, there is higher layer data, and preconfigured uplink resource reconfiguration information is included |

Alternatively, the third field may indicate, by using four value states, whether the first information is transmitted. For example, the first state indicates that the preconfigured uplink resource reconfiguration information is included and there is higher layer data, and may further indicate successful transmission; the second state indicates that the preconfigured uplink resource reconfiguration information is not included and there is higher layer data, and may further indicate successful transmission; the third state indicates that the preconfigured uplink resource reconfiguration information is included and there is no higher layer data, and may further indicate successful transmission; and the fourth state indicates that the preconfigured uplink resource reconfiguration information is not included and there is no higher layer data, and may further indicate successful transmission. Refer to Table 6.

TABLE 6

| Third field | Indication content |
| --- | --- |
| First state | Successful transmission, preconfigured uplink resource reconfiguration information is included, and there is higher layer data |
| Second state | Successful transmission, preconfigured uplink resource reconfiguration information is not included, and there is higher layer data |
| Third state | Successful transmission, preconfigured uplink resource reconfiguration information is included, and there is no higher layer data |
| Fourth state | Successful transmission, preconfigured uplink resource reconfiguration information is not included, and there is no higher layer data |

In another example description, the second field may separately indicate, by using a state 1 and a state 2, whether there is higher layer data, and the third field may separately indicate, by using a state 3 and a state 4, whether the preconfigured uplink resource reconfiguration information is included. For example, if the second field is in state 1 and the third field is in state 3, it indicates that there is no higher layer data and the preconfigured uplink resource reconfiguration information is not included; if the second field is in state 1 and the third field is in state 4, it indicates that there is higher layer data and the preconfigured uplink resource reconfiguration information is not included; if the second field is in state 2 and the third field is in state 3, it indicates that there is no higher layer data and the preconfigured uplink resource reconfiguration information is included; or if the second field is in state 2 and the third field is in state 4, it indicates that there is higher layer data and the preconfigured uplink resource reconfiguration information is included. Refer to Table 7-1.

TABLE 7-1

| Second field | Third field | Indication content |
| --- | --- | --- |
| State 1 | State 3 | There is no higher layer data, and preconfigured uplink resource reconfiguration information is not included |
| | State 4 | There is no higher layer data, and preconfigured uplink resource reconfiguration information is included |
| State 2 | State 3 | There is higher layer data, and preconfigured uplink resource reconfiguration information is included |
| | State 4 | There is higher layer data, and preconfigured uplink resource reconfiguration information is not included |

The following uses an example in which the second field is resource block assignment, and the third field is new data indicator (new data indicator, NDI). If all bits in the resource block assignment are set to 1, it indicates that there is no higher layer data; or if not all bits in the resource block assignment are set to 1, it indicates that there is higher layer data. If the NDI is in fifth state, it indicates that the preconfigured uplink resource reconfiguration information is included; or if the NDI is in sixth state, it indicates that the preconfigured uplink resource reconfiguration information is not included. Refer to Table 7-2 or Table 8.

TABLE 7-2

| Resource block | NDI | Indication content |
| --- | --- | --- |
| All bits are set to 1 | Fifth state | There is no higher layer data, and preconfigured uplink resource reconfiguration information is included |
| | Sixth state | There is no higher layer data, and preconfigured uplink resource reconfiguration information is not included |
| Other values (not all 1s) | Fifth state | There is higher layer data, and preconfigured uplink resource reconfiguration information is included |
| | Sixth state | There is higher layer data, and preconfigured uplink resource reconfiguration information is not included |

TABLE 8

| Resource block | NDI | Indication content |
| --- | --- | --- |
| All bits are set to 1 | Fifth state | There is no higher layer data, and preconfigured uplink resource reconfiguration information is included |
| | Sixth state | There is no higher layer data, and preconfigured uplink resource reconfiguration information is not included |
| Other values (not all 1s) | | There is higher layer data |

It should be understood that Table 7 and Table 8 are merely examples for description. A type of the second field, a state of the second field, a type of the third field, a state of the third field, indication content, a correspondence between a state and indication content, and the like are not specifically limited.

In a possible implementation, the first control information is control information in format N0. The second field may be a subcarrier indication field or an MCS field in the first control information. The third field may be a field other than the second field. This is not specifically limited.

In another possible implementation, the first control information is control information in format N1 and is used to indicate a scheduling grant. The second field may be an MCS field in the first control information. The third field may be a field other than the second field. This is not specifically limited.

In still another example, the first control information is control information in format N1 and is used to indicate a physical control channel instruction. The second field may be a starting number of NPRACH repetitions field, a subcarrier indication of NPRACH field, or a reserved field in the first control information. The third field may be a field other than the second field. This is not specifically limited.

In some embodiments, the first device may indicate first indication information in the first control information in, but not limited to, any one of the following manners.

Manner 1: A flag for uplink/downlink differentiation of the first control information, for example, a flag for format 6-0A/format 6-1A differentiation or a flag for format N0/format N1 differentiation, may be used. Dynamic DCI is not required for preconfigured-resource transmission. When the preconfigured-resource transmission succeeds, one or more of an ACK, downlink higher layer data, and preconfigured uplink resource reconfiguration information are usually fed back. Therefore, DCI for scheduling downlink data may be used for scheduling. When the preconfigured-resource transmission fails, a NACK and/or retransmission scheduling information are/is fed back. Therefore, DCI for scheduling uplink data is used for scheduling. Therefore, a flag for differentiation in downlink control information may be reused as an indication of an ACK/a NACK. To be specific, when the flag is 0, it indicates a NACK, or when the flag is 1, it indicates an ACK. In this way, DCI overheads can be reduced, and DCI usage flexibility can be improved. The flag for format 6-0A/format 6-1A differentiation is used as an example. A manner in which the flag for uplink/downlink differentiation indicates the first indication information may be shown in Table 9.

TABLE 9

| Flag for format 6-0A/format 6-1A differentiation | Indication content |
| --- | --- |
| 0 | Unsuccessful reception |
| 1 | Successful reception |

It should be understood that Table 9 is merely an example for description. A type of the field, a state of the field, a correspondence between a state and indication content, and the like are not specifically limited.

Further, if the first indication information indicates that the preconfigured-resource transmission fails, the first device may further indicate third information by using the first control information, where the third information is used to indicate the second device to perform one or more of the following actions: random access initiation, early data transmission (early data transmission, EDT), a NACK, scheduling retransmission, preconfigured-resource retransmission, or preconfigured-resource retransmission and configuration update. For example, refer to Table 10. The scheduling retransmission may be scheduling retransmission performed by using the dynamic DCI. In this manner, redundant bit information in the first control information may be further used to indicate the second device to fall back (fallback) (that is, indicate the second device to perform random access initiation or EDT) or perform preconfigured-resource retransmission, preconfigured-resource reconfiguration, or the like, so that a transmission success probability can be increased, and DCI usage flexibility can be improved.

TABLE 10

| | 1st field | 2nd field | Indication content |
|---|---|---|---|
| The first control information is control information (for example, in format 6-1A or format 6-0A) for a CE mode A user | All bits in resource block assignment in DCI (in format 6-0A) for scheduling uplink data are set to 1, or an NDI field is in first state | The second bit is in first state | NACK, random access initiation, or early data transmission |
| | | The second bit is in second state | Preconfigured-resource retransmission and configuration update |
| | Not all bits in resource block assignment in DCI (in format 6-0A) for scheduling uplink data are set to 1, or an NDI field is in second state | | Scheduling retransmission |
| The first control information is control information (for example, in format 6-1B or format 6-0B) for a CE mode B user | All bits in MCS in DCI (in format 6-0B) for scheduling uplink data are set to 1, or an NDI field is in first state | The second bit is in first state | NACK, random access initiation, or early data transmission |
| | | The second bit is in second state | Preconfigured-resource retransmission and configuration update |
| | Not all bits in MCS in DCI (in format 6-0B) for scheduling uplink data are set to 1, or an NDI field is in second state | | Scheduling retransmission |

It should be understood that Table 10 is merely an example for description. A type of the 1st field, a state of the 1st field, a type of the 2nd field, a state of the 2nd field, indication content, a correspondence between a state and indication content, and the like are not specifically limited.

Manner 2: If the first control information is control information (for example, in format 6-1A or format 6-0A) for a user in coverage enhancement mode A, coverage enhancement level 0, or coverage enhancement level 1, the first indication information may be indicated by using the resource block assignment field. For example, all bits in a resource block assignment field in DCI (in format 6-1A) for scheduling downlink data may be set to 1, to indicate successful transmission; or all bits in a resource block assignment field in DCI (in format 6-0A) for scheduling uplink data may be set to 1, to indicate unsuccessful transmission.

If the first control information is control information (for example, in format 6-1B or format 6-0B) for a user in coverage enhancement mode B, coverage enhancement level 2, or coverage enhancement level 3, all bits in a resource block assignment field in DCI (in format 6-1B) for scheduling downlink data may be set to 1, to indicate successful transmission; or all bits in an MCS field in DCI (in format 6-0A) for scheduling uplink data may be set to 1, to indicate unsuccessful transmission. Refer to FIG. 11.

TABLE 11

| | Field | Indication content |
|---|---|---|
| The first control information is control information for a CE mode A user | All bits in resource block assignment in DCI for scheduling downlink data are set to 1 | Successful reception |
| | All bits in resource block assignment in DCI for scheduling uplink data are set to 1, or an NDI field is in first state | Unsuccessful reception |
| The first control information is control information for a CE mode B user | All bits in resource block assignment in DCI for scheduling downlink data are set to 1 | Successful reception |
| | All bits in MCS in DCI for scheduling uplink data are set to 1, or an NDI field is in second state | Unsuccessful reception |

It should be understood that Table 11 is merely an example for description. A type of the field, a state of the field, a correspondence between a state and indication content, and the like are not specifically limited.

In the foregoing manner 2, a reserve state in the DCI is used to indicate whether correct transmission is ensured, so that DCI overheads can be reduced, and DCI usage flexibility can be improved.

Manner 3: If the first control information is control information (for example, in format 6-1A or format 6-0A) for a user in coverage enhancement mode A, coverage enhancement level 0, or coverage enhancement level 1, the first indication information may be indicated by using the resource block assignment field. For example, if all bits in a resource block assignment field in DCI for scheduling uplink data are set to 1, it indicates successful reception; or if not all bits in a resource block assignment field in DCI for scheduling uplink data are set to 1, it indicates unsuccessful reception. If the first control information is control information (for example, in format 6-1B or format 6-0B) for a user in coverage enhancement mode B, coverage enhancement level 2, or coverage enhancement level 3, the first indication information may be indicated by using the MCS field. For example, if all bits in an MCS field in DCI for scheduling uplink data are set to 1, it indicates successful reception; or if not all bits in an MCS field in DCI for scheduling uplink data are set to 1, it indicates unsuccessful reception. Refer to Table 12. This implementation is applicable to a case in which an ACK/a NACK is fed back by using uplink DCI. In this manner, a reserve state in the DCI is used to indicate whether correct transmission is ensured, so that DCI overheads can be reduced, and DCI usage flexibility can be improved.

TABLE 12

| | Field | Indication content |
|---|---|---|
| The first control information is control information for a CE mode A user | All bits in resource block assignment in DCI for scheduling uplink data are set to 1, or an NDI field is in first state | Successful transmission |
| | Not all bits in resource block assignment in DCI for scheduling uplink data are set to 1, or an NDI field is in second state | Unsuccessful transmission |
| The first control information is control information for a CE mode B user | All bits in MCS in DCI for scheduling uplink data are set to 1, or an NDI field is in third state | Successful transmission |
| | Not all bits in MCS in DCI for scheduling uplink data are set to 1, or an NDI field is in fourth state | Unsuccessful transmission |

It should be understood that Table 12 is merely an example for description. A type of the field, a state of the field, a correspondence between a state and indication content, and the like are not specifically limited.

Manner 4: The first indication information may be indicated by using one bit in the first control information. For example, 1 may be used to indicate successful transmission, and 0 may be used to indicate unsuccessful transmission. Certainly, 0 may alternatively be used to indicate successful transmission, and 1 may alternatively be used to indicate unsuccessful transmission. Refer to FIG. 13. The bit may be a bit newly added to the first control information, or may be an original bit in the first control information.

TABLE 13

| Bit | Indication content |
|---|---|
| First value | Successful reception |
| Second value | Unsuccessful reception |

Manner 5: The first indication information may be indicated by using two fields. For example, if the first control information is control information (for example, in format 6-1A or format 6-0A) for a user in coverage enhancement mode A, coverage enhancement level 0, or coverage enhancement level 1, the $1^{st}$ field may be a resource block assignment field (or an NDI field), the $2^{nd}$ field may be one bit in an MCS field, to indicate the first indication information. For example, if all bits in a resource block assignment field in DCI for scheduling uplink data are set to 1, and the bit in the MCS field is 1, it indicates successful transmission (an ACK). If all bits in a resource block assignment field in DCI for scheduling uplink data are set to 1, and the bit in the MCS field is 0, it indicates unsuccessful transmission and only a NACK, to trigger the second device to perform fallback or PUR retransmission. If the resource block assignment field is in another state, it may indicate unsuccessful transmission and scheduling retransmission. If the first control information is control information (for example, in format 6-1B or format 6-0B) for a user in coverage enhancement mode B, coverage enhancement level 2, or coverage enhancement level 3, the $1^{st}$ field may be an MCS field (or an NDI field), the $2^{nd}$ field may be one bit in a repetition number (repetition number) field, to indicate the first indication information. For example, if all bits in an MCS field in DCI for scheduling uplink data are set to 1, and the bit in the repetition number field is 1, it indicates successful transmission (an ACK). If all bits in an MCS field in DCI for scheduling uplink data are set to 1, and the bit in the repetition number field is 0, it indicates unsuccessful transmission and only a NACK, to trigger the second device to perform fallback or PUR retransmission. If the MCS field is in another state, it may indicate unsuccessful transmission and scheduling retransmission. This implementation is applicable only to a case in which an ACK/a NACK is fed back by using uplink DCI. In this manner, a reserve state in the DCI is used to indicate whether correct transmission is ensured, so that DCI overheads can be reduced, and DCI usage flexibility can be improved. Refer to FIG. 14.

TABLE 14

| | $1^{st}$ field | $2^{nd}$ field | Indication content |
|---|---|---|---|
| The first control information is control information for a CE mode A user | All bits in resource block assignment in DCI for scheduling uplink data are set to 1, or an NDI field is in first state | First value Second value | ACK ACK |
| The first control information is control | All bits in an MCS field in DCI for scheduling uplink | First value | ACK |

TABLE 14-continued

| 1st field | | 2nd field | Indication content |
|---|---|---|---|
| information for a CE mode B user | data are set to 1, or an NDI field is in first state | Second value | ACK |

It should be understood that Table 14 is merely an example for description. A type of the 1st field, a state of the 1st field, a type of the 2nd field, a state of the 2nd field, indication content, a correspondence between a state and indication content, and the like are not specifically limited.

During specific implementation, the 2nd field may be further extended to a plurality of bits, and is used to indicate one or more of random access initiation, EDT, an ACK, preconfigured-resource retransmission, or preconfigured-resource retransmission and configuration update. For example, refer to Table 15.

TABLE 15

| 1st field | | 2nd field | Indication content |
|---|---|---|---|
| The first control information is control information for a CE mode A user | All bits in resource block assignment in DCI for scheduling uplink data are set to 1, or an NDI field is in first state | Third value | ACK |
| | | Fourth value | ACK and configuration update |
| | | Fifth value | NACK, random access initiation, or early data transmission |
| | | Sixth value | Preconfigured-resource retransmission and configuration update |
| | Not all bits in resource block assignment in DCI for scheduling uplink data are set to 1, or an NDI field is in second state | | Scheduling retransmission |
| The first control information is control information for a CE mode B user | All bits in an MCS field in DCI for scheduling uplink data are set to 1, or an NDI field is in first state | Third value | ACK |
| | | Fourth value | ACK and configuration update |
| | | Fifth value | NACK, random access initiation, or early data transmission |
| | | Sixth value | Preconfigured-resource retransmission and configuration update |
| | Not all bits in an MCS field in DCI for scheduling uplink data are set to 1, or an NDI field is in second state | | Scheduling retransmission |

In a possible implementation, in the foregoing several example descriptions, cyclic redundancy check (cyclic redundancy check, CRC) code of the first control information may be scrambled by using first scrambling code, where the first scrambling code may be a system information radio network temporary identifier (system information radio network temporary identifier, SI-RNTI).

In some embodiments, the first control information may further include HARQ-ACK (or PUCCH) configuration information. The configuration information may include, but is not limited to, one or more of the following information: time-frequency resource information (where a time-frequency resource may be configured in a manner such as two-level configuration or higher-layer configuration), feedback time (namely, a delay), power control information, a repetition number, or the like. The time-frequency resource information may be specific resource configuration information, a resource index, or the like.

Figure 4:
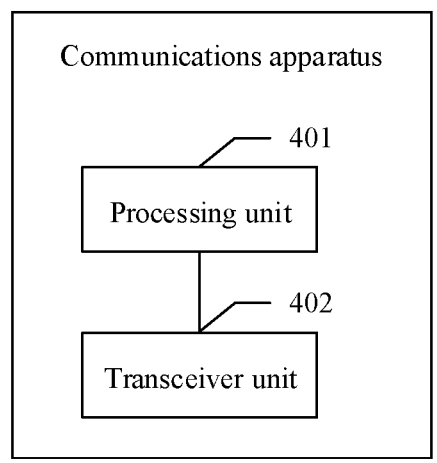
FIG. 4 is a schematic structural diagram of a communications apparatus according to an embodiment of this application.

Based on a same inventive concept as the method embodiments, an embodiment of this application provides a communications apparatus. A structure of the communications apparatus may be shown in FIG. 4. The communications apparatus includes a processing unit 401 and a transceiver unit 402.

In a specific implementation, the apparatus is specifically configured to implement the function of the first device in the embodiment in FIG. 3. The apparatus may be the first device, or may be a chip, a chip set, or a part of a chip, where the chip and the chip set are in the first device, and the part of the chip is configured to perform a function of a related method. Specifically, the processing unit 401 is configured to determine first control information, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or preconfigured uplink resource reconfiguration information. The transceiver unit 402 is configured to send the first control information determined by the processing unit 401 to the second device.

In another specific implementation, the apparatus is specifically configured to implement the function of the second device in the embodiment in FIG. 3. The apparatus may be the second device, or may be a chip, a chip set, or a part of a chip, where the chip and the chip set are in the second device, and the part of the chip is configured to perform a function of a related method. Specifically, the transceiver unit 402 is configured to receive data. The processing unit 401 is configured to: control the transceiver unit 402 to receive first control information sent by a first device, where the first control information includes first indication information and second indication information, where the first indication information is used to indicate a state of preconfigured-resource transmission, and the state includes successful transmission, unsuccessful transmission, scheduling retransmission, or preconfigured-resource retransmission; and the second indication information is used to indicate whether the first device transmits first information, and the first information includes higher layer data and/or preconfigured uplink resource reconfiguration information; and after determining that the second indication information indicates that the first device transmits the first information, control the transceiver unit 402 to receive, based on the second indication information, the first information.

With reference to the foregoing two specific implementations, the second indication information may include indication information used to indicate whether the first information is carried on a physical shared channel scheduled by the first control information. Alternatively, the second indication information may include indication information used to indicate the second device whether to detect second control information, where the second control information is used to schedule the first information. Alternatively, the second indication information may include indication information used to indicate whether the first control information includes the preconfigured uplink resource reconfiguration information. Alternatively, the second indication information may include indication information used to indicate whether the second device includes the preconfigured uplink resource reconfiguration information in the first control information, and indication information used to indicate the second device whether to detect third control information, where the third control information is used to schedule the higher layer data.

For example, a first field in the first control information may be used to indicate the second indication information.

In an example description, the first control information is control information in format 6-1A or format 6-1B. The first field may be a resource block assignment field in the first control information.

In another example description, when all bits in the first field are set to 1, the second indication information may indicate that the first device transmits the first information; or when not all bits in the first field are set to 1, the second indication information may indicate that the first device does not transmit the first information.

In still another example description, the first control information is control information in format N0. The first field may be a subcarrier indication field or a modulation and coding scheme field in the first control information.

In yet another example description, the first control information is control information in format N1 and is used to indicate a scheduling grant. The first field may be a modulation and coding scheme field in the first control information.

In another example description, the first control information is control information in format N1 and is used to indicate a physical control channel instruction. The first field may be a starting number of NPRACH repetitions field, a subcarrier indication of NPRACH field, or a reserved field in the first control information.

For example, a second field and a third field in the first control information are used to indicate the second indication information.

In an example description, the second field may be a resource block assignment field in the first control information. If all bits in the second field are set to 1, the third field is used to indicate the second indication information.

In an implementation, CRC of the first control information may be scrambled by using an SI-RNTI.

In the embodiments of this application, division into modules is an example, and is merely logical function division. During actual implementation, there may be another division manner. In addition, in the embodiments of this application, functional modules may be integrated into one processor, or each of the modules may exist alone physically, or two or more modules may be integrated into one module. The integrated module may be implemented in a form of hardware, or may be implemented in a form of a software function module.

Figure 5:
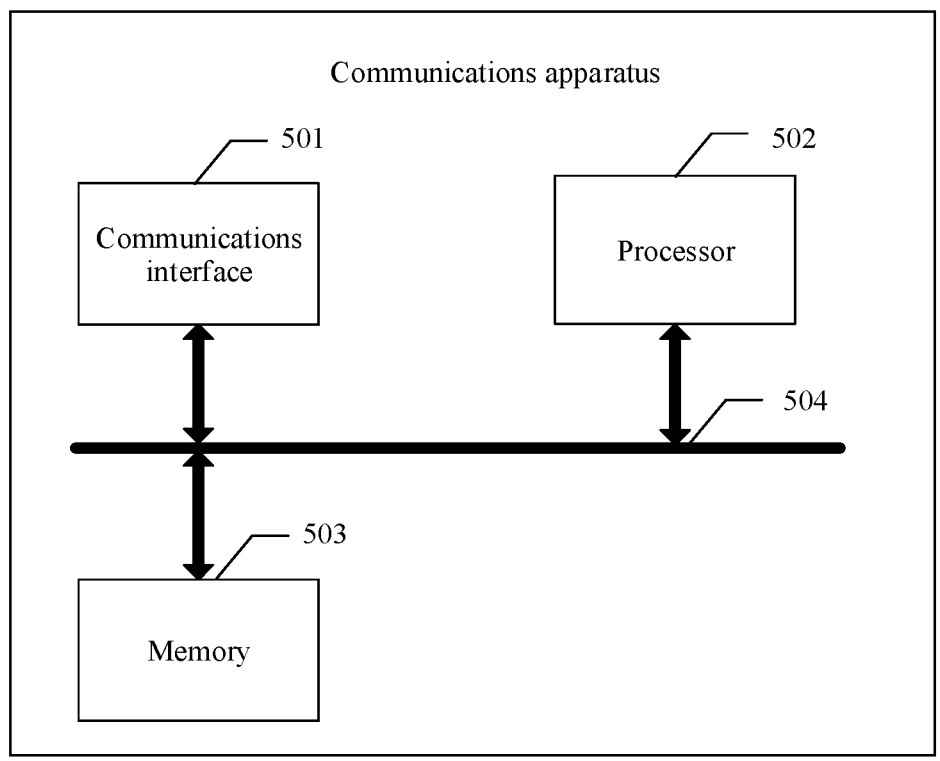
FIG. 5 is a schematic structural diagram of a communications apparatus according to an embodiment of this application.

When the integrated module may be implemented in the form of hardware, the communications apparatus may be shown in FIG. 5, and the processing unit 401 may be a processor 502. The processor 502 may be a CPU, a digital processing module, or the like. The transceiver unit 402 may be a communications interface 501. The communications interface 501 may be a transceiver, or may be an interface circuit such as a transceiver circuit, or may be a transceiver chip, or the like. The communications apparatus further includes a memory 503, configured to store a program executed by the processor 502. The memory 503 may be a non-volatile memory, for example, an HDD or an SSD, or may be a volatile memory, for example, a RAM. The memory 503 is any other medium that can be configured to carry or store expected program code in a form of an instruction or a data structure and that can be accessed by a computer, but is not limited thereto.

The processor 502 is configured to execute the program code stored in the 503, and is specifically configured to perform an action of the processing unit 401. Details are not described in this application again.

In this embodiment of this application, a specific connection medium between the communications interface 501, the processor 502, and the memory 503 is not limited. In this embodiment of this application, the memory 503, the processor 502, and the communications interface 501 are connected by using a bus 504 in FIG. 5. The bus 504 is represented by using a bold line in FIG. 5. The foregoing is merely an example for description. A connection manner of other components is not limited thereto. The bus 504 may be classified into an address bus, a data bus, a control bus, and the like. For ease of representation, only one thick line is used to represent the bus in FIG. 5, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or another programmable device, thereby generating computer-implemented processing. Therefore, the instructions executed on the computer or the other programmable device provide steps for implementing a specified function in one or more processes in the flowcharts and/or in one or more blocks in the block diagrams.

Clearly, a person skilled in the art can make various modifications and variations to the embodiments of this application without departing from the scope of this application. This application is intended to cover these modifications and variations of the embodiments of this application provided that they fall within the scope of protection defined by the following claims and their equivalent technologies.

What is claimed is:

1. A communications method, comprising:
   determining, by a first device, first control information, wherein the first control information includes a first field and a second field, wherein the first field is a modulation and coding scheme field of the first control information, the first field indicates that a second device does not need to monitor a first search space for second control information, and the second field indicates that, the first control information includes reconfiguration information of a pre-configured resource, and whether transmission on the pre-configured resource is successful or not, wherein the second control information is used to schedule data; and
   sending, by the first device, the first control information to the second device.

2. The communications method according to claim 1, wherein the first control information is format N0.

3. The communications method according to claim 1, wherein a value of the modulation and coding scheme field is one of 11 to 15.

4. The communications method according to claim 3, wherein the value of the modulation and coding scheme field is 14.

5. The communications method according to claim 1, wherein the reconfiguration information includes at least one of timing advance, power control information, repetition number, modulation and coding scheme, or resource block size.

6. A communications method, comprising:
   receiving, by a second device, first control information from a first device, wherein the first control information includes a first field and a second field, wherein the first field is a modulation and coding scheme field of the first control information, the first field indicates that the second device does not need to monitor a first search space for second control information, and the second field indicates that, the first control information includes reconfiguration information of a pre-configured resource, and whether transmission on the pre-configured resource is successful or not, wherein the second control information is used to schedule data;
   according to the second field, obtaining, by the second device, the reconfiguration information of the pre-configured resource from the first control information, and determining, by the second device, whether transmission on the pre-configured resource is successful or not; and
   determining, by the second device, that the second device does not need to monitor the first search space based on the first field.

7. The communications method according to claim 6, wherein the first control information is format N0.

8. The communications method according to claim 6, wherein a value of the modulation and coding scheme field is one of 11 to 15.

9. The communications method according to claim 8, wherein the value of the modulation and coding scheme field is 14.

10. The communications method according to claim 6, wherein the reconfiguration information includes at least one of timing advance, power control information, repetition number, modulation and coding scheme, or resource block size.

11. A communication apparatus, comprising:
    a transceiver;
    at least one processor; and
    one or more memories coupled to the at least one processor and storing programming instructions for execution by the at least one processor to cause the first device to:
      determine first control information, wherein the first control information includes a first field and a second field, wherein the first field is a modulation and coding scheme field of the first control information, the first field indicates that a second device does not need to monitor a first search space for second control information, and the second field indicates that, the first control information includes reconfiguration information of a pre-configured resource, and whether transmission on the pre-configured resource is successful or not, wherein the second control information is used to schedule data; and send, through the transceiver, the first control information to the second device.

12. The communication apparatus according to claim 11, wherein the first control information is format N0.

13. The communication apparatus according to claim 11, wherein a value of the modulation and coding scheme field is one of 11 to 15.

14. The communication apparatus according to claim 13, wherein the value of the modulation and coding scheme field is 14.

15. The communication apparatus according to claim 11, wherein the reconfiguration information includes at least one of timing advance, power control information, repetition number, modulation and coding scheme, or resource block size.

16. The communications apparatus according to claim 11, wherein the communication apparatus is a first device or a chip in the first device.

17. A communication apparatus, comprising:
a transceiver;
at least one processor; and
one or more memories coupled to the at least one processor and storing programming instructions for execution by the at least one processor to cause the second device to:
receive, through the transceiver, first control information from a first device, wherein the first control information includes a first field and a second field, wherein the first field is a modulation and coding scheme field of the first control information, the first field indicates that the second device does not need to monitor a first search space for second control information, and the second field indicates that, the first control information includes reconfiguration information of a pre-configured resource, and whether transmission on the pre-configured resource is successful or not, wherein the second control information is used to schedule data;
according to the second field, obtain the reconfiguration information of the pre-configured resource from the first control information and determine whether transmission on the pre-configured resource is successful or not; and
determine that the second device does not need to monitor the first search space based on the first field.

18. The communication apparatus according to claim 17, wherein the first control information is format N0.

19. The communication apparatus according to claim 17, wherein a value of the modulation and coding scheme field is one of 11 to 15.

20. The communication apparatus according to claim 19, wherein the value of the modulation and coding scheme field is 14.

21. The communication apparatus according to claim 17, wherein the reconfiguration information includes at least one of timing advance, power control information, repetition number, modulation and coding scheme, or resource black size.

22. The communications apparatus according to claim 17, wherein the communication apparatus is a second device or a chip in the second device.

* * * * *

UNITED STATES PATENT AND TRADEMARK OFFICE
CERTIFICATE OF CORRECTION

| | | |
|---|---|---|
| PATENT NO. | : 12,302,340 B2 | Page 1 of 1 |
| APPLICATION NO. | : 17/489317 | |
| DATED | : May 13, 2025 | |
| INVENTOR(S) | : Wenping Bi et al. | |

It is certified that error appears in the above-identified patent and that said Letters Patent is hereby corrected as shown below:

In the Claims

In Column 32, In Line 29 (Approx.), In Claim 21, delete "black" and insert -- block --.

Signed and Sealed this
Thirtieth Day of September, 2025

John A. Squires
*Director of the United States Patent and Trademark Office*